United States Patent [19]
Bejar

[11] Patent Number: 5,991,779
[45] Date of Patent: *Nov. 23, 1999

[54] PROCESS FOR DISTRIBUTED GARBAGE COLLECTION

[75] Inventor: Arturo Bejar, Mountain View, Calif.

[73] Assignee: Electric Communities, Cupertino, Calif.

[*] Notice: This patent is subject to a terminal disclaimer.

[21] Appl. No.: 09/152,646

[22] Filed: Sep. 14, 1998

Related U.S. Application Data

[63] Continuation of application No. 08/659,194, Jun. 6, 1996, Pat. No. 5,819,299.

[51] Int. Cl.$^6$ .................................................. G06F 17/30
[52] U.S. Cl. ............................................ 707/206; 707/10
[58] Field of Search .................... 707/206, 10; 395/622; 364/200

[56] References Cited

U.S. PATENT DOCUMENTS

| | | | |
|---|---|---|---|
| 4,714,992 | 12/1987 | Gladney et al. | 364/200 |
| 4,755,939 | 7/1988 | Watson | 364/300 |
| 4,797,810 | 1/1989 | McEntee et al. | 364/200 |
| 4,807,120 | 2/1989 | Courts | 364/200 |
| 5,025,367 | 6/1991 | Gurd et al. | 364/200 |
| 5,051,891 | 9/1991 | MacPhail | 364/200 |
| 5,088,036 | 2/1992 | Ellis et al. | 395/425 |
| 5,136,706 | 8/1992 | Courts | 395/622 |
| 5,241,673 | 8/1993 | Schelvis | 395/622 |
| 5,261,088 | 11/1993 | Baird et al. | 395/622 |
| 5,274,804 | 12/1993 | Jackson et al. | 395/622 |
| 5,293,614 | 3/1994 | Fegurson et al. | 395/622 |
| 5,398,334 | 3/1995 | Topka et al. | 395/622 |
| 5,446,901 | 8/1995 | Owicki et al. | 395/700 |
| 5,530,850 | 6/1996 | Ford et al. | 395/622 |
| 5,560,003 | 9/1996 | Nilsen et al. | 395/622 |
| 5,819,299 | 10/1998 | Bejar | 707/206 |

OTHER PUBLICATIONS

Plainfosse et al., Distributed Garbage Collection in the System is Good, IEEE, pp. 94–99, Oct. 1991.

Kafura et al., Concurrent and Distributed Garbage Collection of Active Objects, IEEE, pp. 337–350, Apr. 1995.

Partridge et al, Speculative Parallelism in a Distributed Graph Reduction Machine, IEEE, pp. 771–779, Jan. 1989.

Yu et al, Conservative Garbage Collection on Distributed Shared Memory Systems, IEEE, pp. 402–410, Dec. 1993.

Gupta et al, Reliable Garbage Collection in Distributed Object Oriented Systems, IEEE, pp. 324–328, Oct. 1988.

Kordale et al, Distributed/Concurrent Garbage Collection in Distributed Shared Memory Systems, IEEE, pp. 51–60, Dec. 1993.

Ferreira et al., Persistence by Reachability in Distributed Shared Memeory through Garbage Collection, IEEE, pp. 394–401, May 1996.

Kuechlin et al., On Multi–Threaded List–Processing and Garbage Collection, IEEE, pp. 894–897, Dec. 1991.

*Primary Examiner*—Thomas G. Black
*Assistant Examiner*—Frantz Coby
*Attorney, Agent, or Firm*—Philip H. Albert; Townsend and Townsend and Crew LLP

[57] ABSTRACT

A process and system for distributed garbage collection in a distributed network includes transmission of a root request message tagged with a unique identifier from a suspect node to all nodes of the suspect node's inverse reference graph looking for a rooted (persistent) object. Objects respond to the root request message with an affirmative or disregard response (indicating a root or coupling to a root) tagged with the same identifier or that no relevant garbage collecting information is available from a particular branch. The suspect node, in the absence of any affirmative responses, is identified as obsolete (garbage) and may be collected. Other objects having the same identifier are identified and/or collected as garbage as well.

2 Claims, 6 Drawing Sheets

PROCESS FOR DISTRIBUTED GARBAGE COLLECTION

CROSS-REFERENCES TO RELATED APPLICATIONS

The present application is a continuation of and claims the benefit of U.S. application Ser. No. 08/659,194, filed Jun. 6, 1996 now U.S. Pat. No. 5,819,299 the disclosures of which are incorporated by reference.

BACKGROUND OF THE INVENTION

The present invention relates generally to distributed computer systems in which multiple processes are able to access network objects, and particularly to a method for garbage collecting cycles of distributed network objects.

The term garbage collection describes a process implemented on one or more interconnected general purpose machines (real or virtual) for effectively deleting obsolete data from a memory associated with the machines. Problems and solutions to garbage collection are well known. For example U.S. Pat. No. 5,241,673 and U.S. Pat. No. 5,446,901, hereby expressly incorporated by reference for all purposes, describe general background information as well as conventional solutions to Distributed Garbage Collection.

An object is a construct of a computing machine. To instantiate an object, a machine allocates a portion of its memory in order to define and make use of the object. During operation of a machine, objects are continually created, used and obsoleted. As memory is limited, it is desirable to identify and collect obsolete objects (objects no longer required by any existing object) so that memory previously allocated to obsolete objects may be used by the machine, such as to create new objects. Sometimes collection of these obsolete objects lags behind their obsolescence and the operation of the machine may begin to be degraded as a consequence.

Conventional solutions for garbage collection, such as those described in the patents incorporated above, include methods for checking each object to determine whether it is obsolete and should be collected. In a method of this type, referred to as a mark and sweep process, an analysis begins at all root objects stored in the memory of all of the machines making up the distributed system. A forward reference graph defines a relationship between a root object and all the secondary objects that the root object references. The secondary objects may include references to tertiary objects, which may include further references to other objects. Objects may be instantiated in different portions of the collective memory of all of the concurrent processes in all of the different machines. Mark and sweep requires that several messages be sent to and received from every object. As a consequence, mark and sweep solutions to distributed garbage collection are expensive in terms of time and message overhead.

In addition to these incorporated patents, another reference describing a conventional solution to Distributed Garbage Collection is Garbage Collection on an Open Network, International Work on Memory Management, Spring Verlag LNCS 986, 1985 by Matthew Fuchs, also hereby expressly incorporated by reference for all purposes. Garbage Collection on an Open Network describes a total solution to Distributed Garbage Collection that makes use of inverse reference graphs. Construction, maintenance and use of inverse reference graphs is well known and will not be described in detail herein. An inverse reference graph includes objects represented as nodes with edges between pairs of nodes defining a referential relationship between the pairs of objects represented by the nodes.

Cyclical garbage is a special class of garbage that requires special processing for identification so that it may be collected. FIG. 1 is an inverse reference graph for a cycle 100 including a collection of three objects (first object 102, second object 104, and third object 106). In cycle 100, object 102 has a first reference arrow 108 pointing to object 104. The direction of reference arrow 108 reflects that object 104 references object 102. In other words, reference arrow 108 starting from object 102 and extending to object 104 means that object 102 is referenced by object 104. Arrows directed away from a node represented on an inverse reference graph define the branches of the node.

In cycle 100, object 104 has a second reference arrow 110 pointing to object 106. Object 106 has a third reference arrow 112 pointing to object 102. The references between the objects are cyclical. Unless one of the objects represents a rooted object, either a local root, or a remote root, cycle 100 is garbage. A locally rooted object is an object that is being referenced by a rooted (persistent, non-collectable object) in the same machine as the object. A remotely rooted object is an object referenced by only objects in remote machines, and all references originate from one or more locally rooted objects.

In the case where cycle 100 resides in a single simple machine with few objects, it is straightforward and inexpensive (in terms of time and a number of message exchanges among the objects) to identify cycles. When cycle 100 becomes distributed across two or more machines and the distributed machines have large numbers of objects to create, use and to identify as obsolete, prior art solutions become expensive to adequately deal with collecting cycles.

SUMMARY OF THE INVENTION

The present invention provides method and apparatus for simply, efficiently and economically identifying and collecting garbage, particularly a special class of garbage known as cycles, particularly in a distributed network. By relying on local garbage collection for collection of isolated and readily determinable garbage, the present invention permits a multi-tiered garbage collection process wherein collection of cycles proceeds asynchronously with regard to collection of other obsolete objects from memory. Identification of cycles using the preferred embodiment is fairly efficient as measured by message overhead.

According to one aspect of the invention, it includes a general purpose computer system. The general purpose computer system includes a multiplicity of concurrently active processes executing on a plurality of machines for instantiating a plurality of objects, a memory, coupled to the plurality of machines, for storing the plurality of objects, and a garbage identifier, coupled to the memory that maintains a suspect list of a subset of the plurality of objects that are candidates for garbage collection, selects a first object from the suspect list, generates an identifier, transmits a root request message, tagged with the identifier, to each of a plurality of referring objects of the first object as identified by an inverse reference graph, wherein each object of the plurality of objects is represented as a node on the inverse reference graph and wherein edges define a referential relationship between any particular two objects of the plurality of objects, receives a reply message, tagged with the identifier, from each object in a subset of the plurality of referring objects that is directly coupled to the first object, the reply message indicating whether any object in the subset of the plurality of referring objects is relevant to determining whether the first object is garbage, and identifies the first object as garbage when none of the reply messages, tagged with the identifier and received from the subset of referring objects, indicates any object in the subset of the plurality of referring objects is relevant to determining whether the first object is garbage.

In operation, the general purpose computer system is part of a distributed computer system having a plurality of concurrently active processes that have instantiated a plurality of objects in a memory associated with the distributed computer system. A method of operating the distributed computer system includes the steps of selecting a suspect object from the plurality of objects for testing to determine whether the suspect object is garbage, identifying an inverse reference graph for the suspect object wherein each object of a subset of objects of the plurality of objects referentially coupled to the suspect object are represented as nodes on the inverse reference graph and wherein each edge between a pair of nodes defines a referential relationship between a pair of objects of the subset of the plurality of objects testing each branch of the inverse graph coupled from a suspect node associated with the suspect object to a referring node associated with a referring object to determine whether any branch of the inverse reference graph is relevant to establish whether the suspect object is garbage, and identifying the suspect node as garbage when no branch is relevant to establish whether the suspect node is garbage.

In an alternate preferred embodiment, a collection message may be sent to all objects storing an identifier associated with a test object determined to be garbage. Additionally, a test object having a cycle in its inverse reference graph is properly tested and identified as garbage if no rooted objects exist anywhere in the inverse reference graph for the test object.

Reference to the remaining portions of the specification, including the drawing and claims, will realize other features and advantages of the present invention. Further features and advantages of the present invention, as well as the structure and operation of various embodiments of the present invention, are described in detail below with respect to accompanying drawing. In the drawing, like reference numbers indicate identical or functionally similar elements.

DESCRIPTION OF THE PREFERRED EMBODIMENTS

Figure 1:
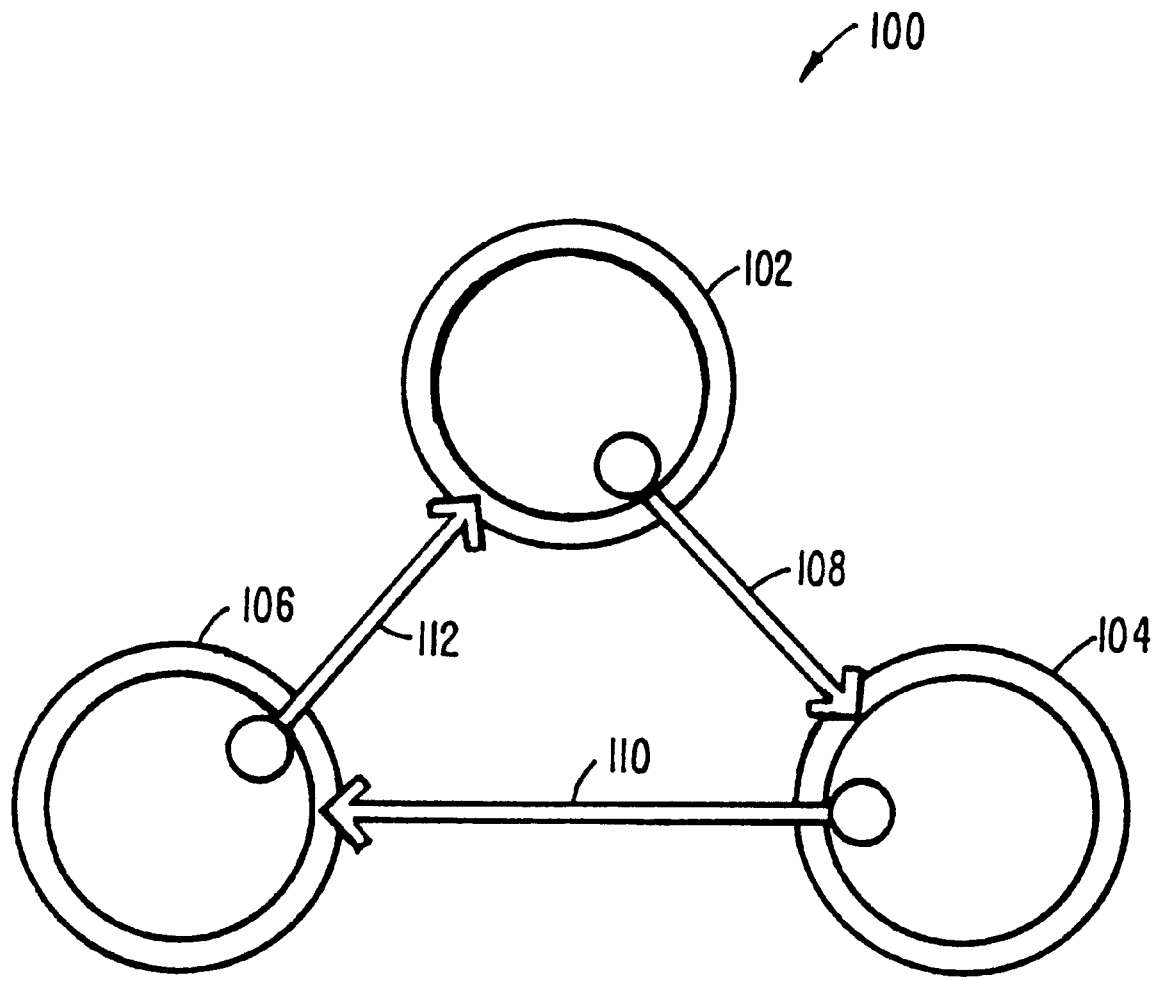
FIG. 1 is an inverse reference graph for a cycle including a collection of three objects (first object, second object, and third object)
Figure 2:
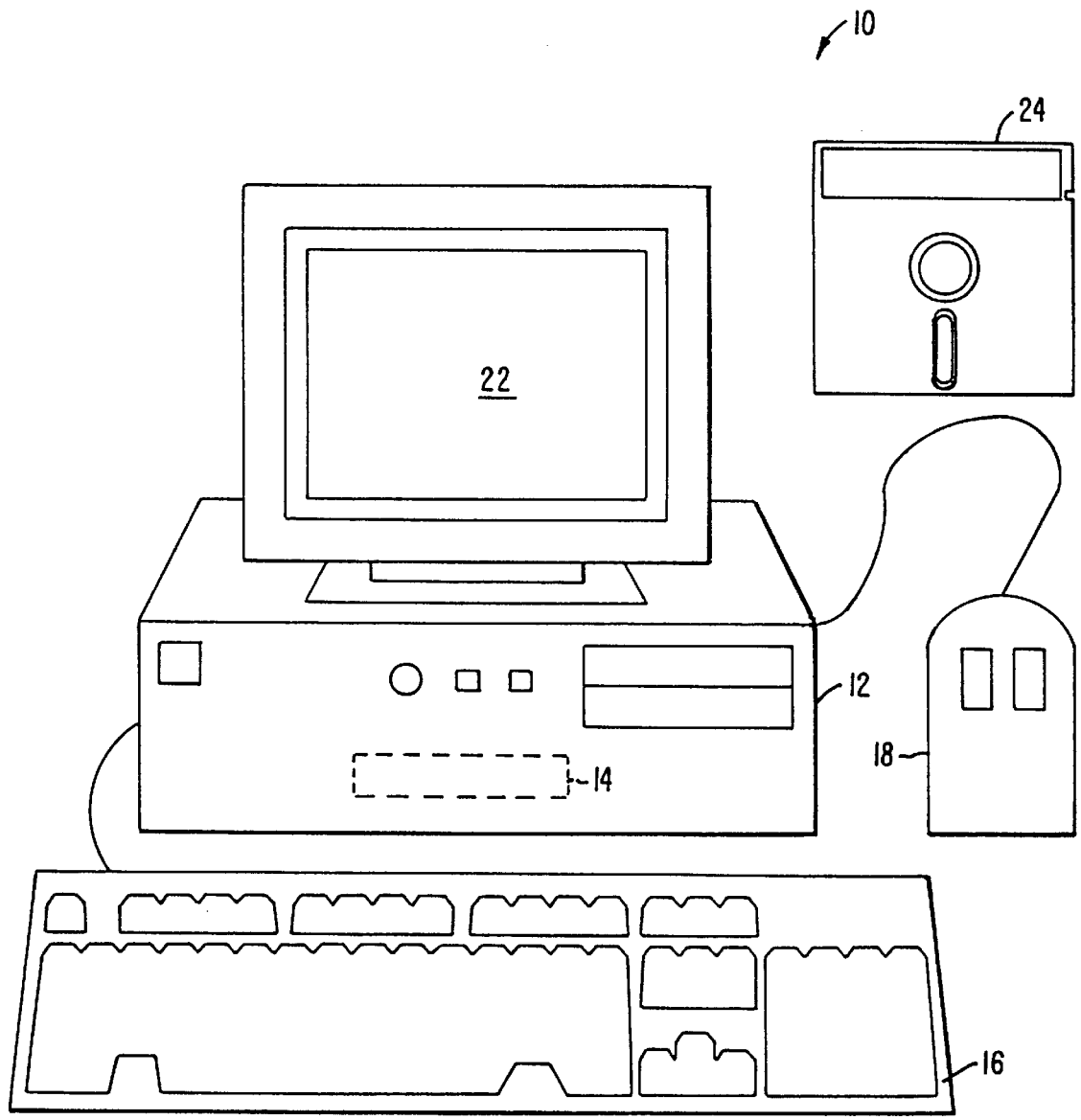
FIG. 2 is a general purpose computer system.

FIG. 2 is a general purpose computer system 10 including a main unit 12, a fixed disk 14, a keyboard 16, a relative pointing device 18 (e.g. mouse or trackball), monitor 20 with display 22. A removable storage cartridge 24 (e.g. floppy disk) interacts with a complementary device, such as a floppy disk drive, in main unit 12. Removable storage cartridge 24 stores data useable by computer system I10 to configure and control its operational and functional characteristics in a well known fashion. Specifically, cartridge 24 stores control information accessible by system 10 to execute the processes described in FIG. 5 and FIG. 6, as appropriate.

Figure 3:
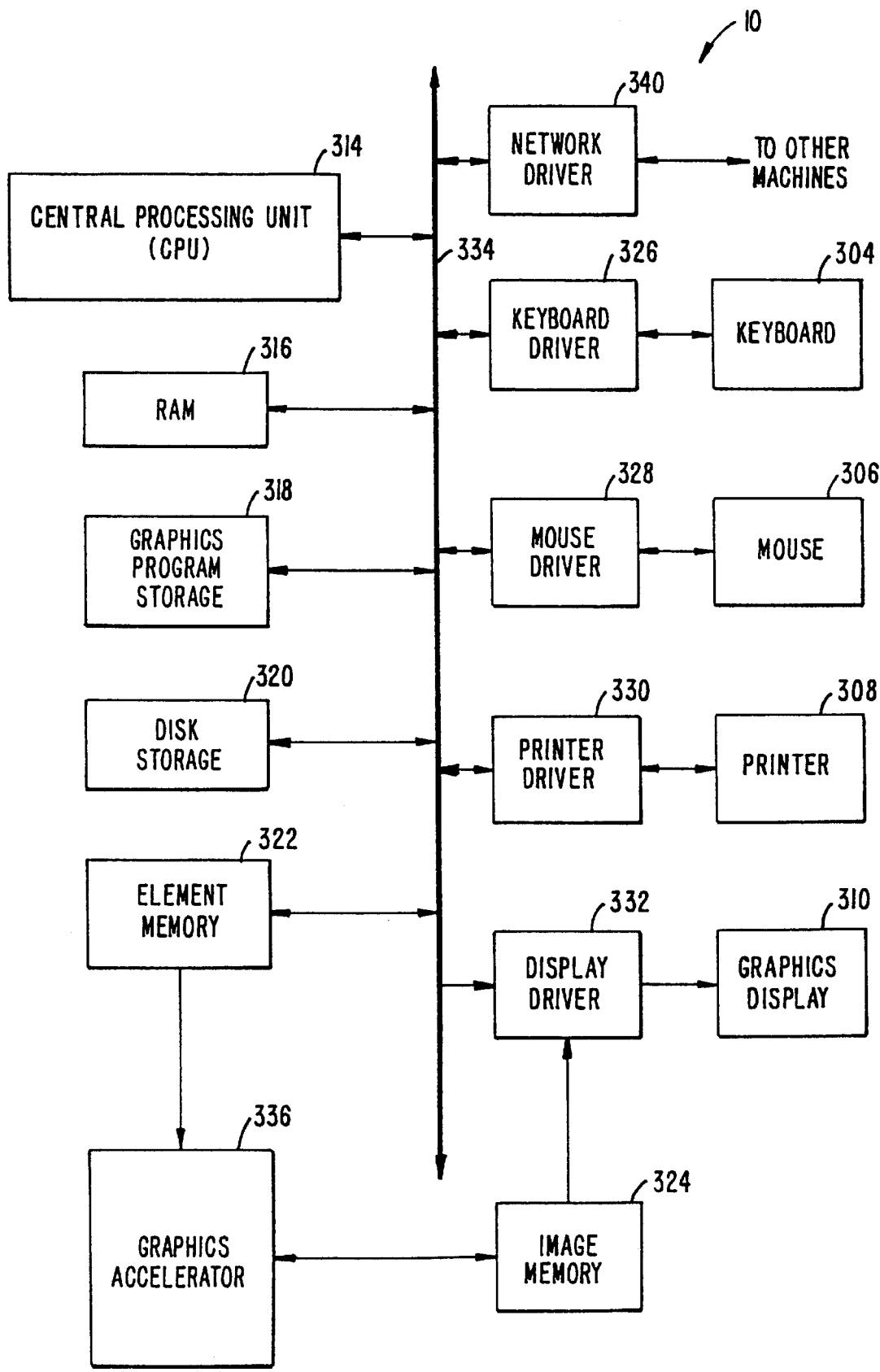
FIG. 3 is a block schematic diagram of functional units of the computer system shown in FIG. 2.

FIG. 3 is a block schematic diagram of functional units of computer system 10 shown in FIG. 2. Computer system 10 includes keyboard 304, mouse 306, graphics display 310, printer 312, central processing unit 314, random access memory 316, graphics program storage 318, disk storage 320, element memory 322, image memory 324, keyboard driver 326, mouse driver 328, printer driver 330, display driver 332, bus 334, graphics accelerator 336, and network driver 340. CPU 314 implements the processes depicted by the flowcharts of FIG. 5 and FIG. 6.

Figure 4:
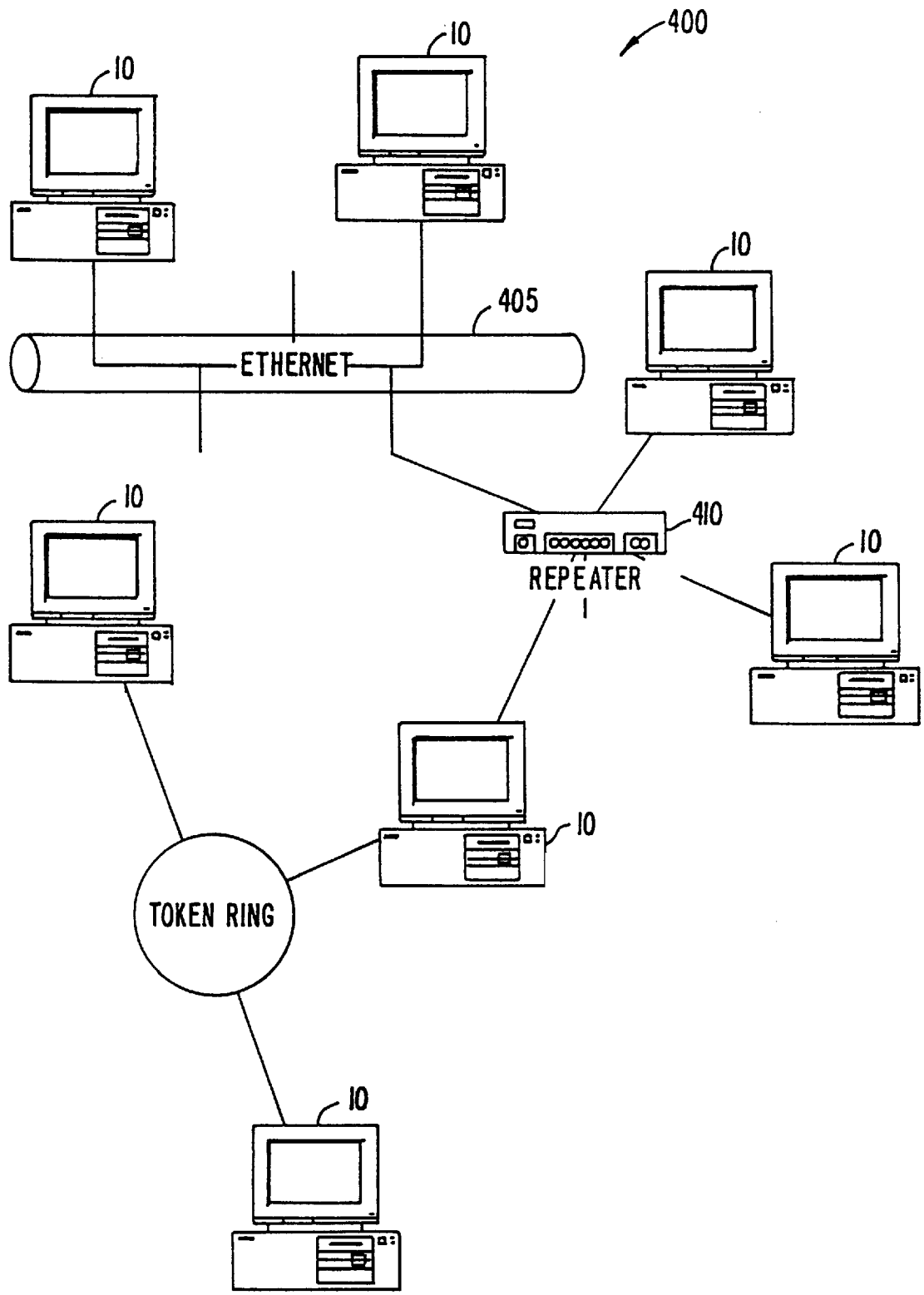
FIG. 4 is a diagram of a distributed network environment for implementing the present invention.

FIG. 4 is a diagram of a distributed network 400 for implementing the present invention. Network 400 includes a plurality of computer systems 10 interconnected by one or more network protocols, as well known. The network protocols may include, for example, an ethernet bus 405 coupled to a repeater 410, as well as a token ring 415 coupled to one or more computer systems 10. Other protocols and interconnection mechanisms are possible and may be used without departing from the present invention.

In the following description, network 400 is described as a multiplicity of computer systems 10, each implementing an operating system capable of executing one or more processes. For purposes of the following description, each computer system 10 is a separate real machine having a separate associated memory. Each machine includes a process that creates objects by allocating some of its associated memory to instantiate an object. As objects are created, used and obsoleted, each machine includes a garbage collecting process to identify isolated obsoleted objects and to remove them from memory. In some cases, the garbage collecting process may not actually remove the object from memory but indicate that the memory previously used by the object is available for use or mark the object for collection by another process. These events are referred to as collecting the object from memory.

In other embodiments, a single computer system 10 may implement two or more virtual machines, each having an associated portion of a single physical memory allocated to each virtual machine. Each virtual machine also includes a local garbage collecting process for removing isolated obsoleted objects from its portion of memory. Virtual machines and real machines are treated as equivalent for purposes of the present invention.

Each machine includes a mechanism for tracking objects instantiated in its memory. Distributed network 400 includes two or more machines interconnected to exchange messages between the various objects and processes present on the machine. The exchange of messages permits distributed network 400 to define reference graphs of the interrelationship of the objects present on the distributed machines. As discussed above, an object present in one machine may have a hierarchical dependency on one or more objects present in one or more other machines. As the number of objects and the number of machines increases, identifying and collecting obsoleted objects becomes increasingly difficult.

The preferred embodiment of the present invention provides for distributed network 400 to collectively implement a distributed garbage collecting process. As will be more particularly explained below, computer 10 implements the processes described in the flowcharts of FIG. 5 and FIG. 6 to identify a cycle of two or more objects distributed in two or more machines. In the most preferred embodiment, an identified cycle will be collected when it is identified. In other embodiments, the identified cycle will be collected by the individual local garbage collection mechanisms operating on the individual objects in the identified cycle. This mechanism collectively collects all of the objects previously in the identified cycle.

By definition, a cycle does not include any rooted objects, locally rooted objects or remotely rooted objects. A rooted object is an object that is referred to (directly or indirectly) by one or more objects that the garbage collector considers to be persistent (uncollectible). A locally rooted object is an object that is referred to by a rooted object in the same machine, while a remotely rooted object is an object that is referred to only by objects in remote machines and all of these references originate in one or more locally rooted objects. One of the characteristics of computer system 10 is that any locally rooted object is able to determine when it loses its locally rooted status.

Distributed network 400 is able to effectively implement the distributed garbage collection of garbage involving cycles, particularly those cycles having objects in two or more machines. The preferred embodiment of the invention, computer systems 10 of distributed network 400, implements the process shown by the flowcharts of FIG. 5 and FIG. 6, as appropriate, in order to identify the cycles. The specific configuration of system 10 or of network 400 is representative of an example system and network, respectively. It is well known that other systems and networks could implement the present invention. Thus, the description of system 10 and network 400 are not to be taken as limitations of the present invention.

Figure 5:
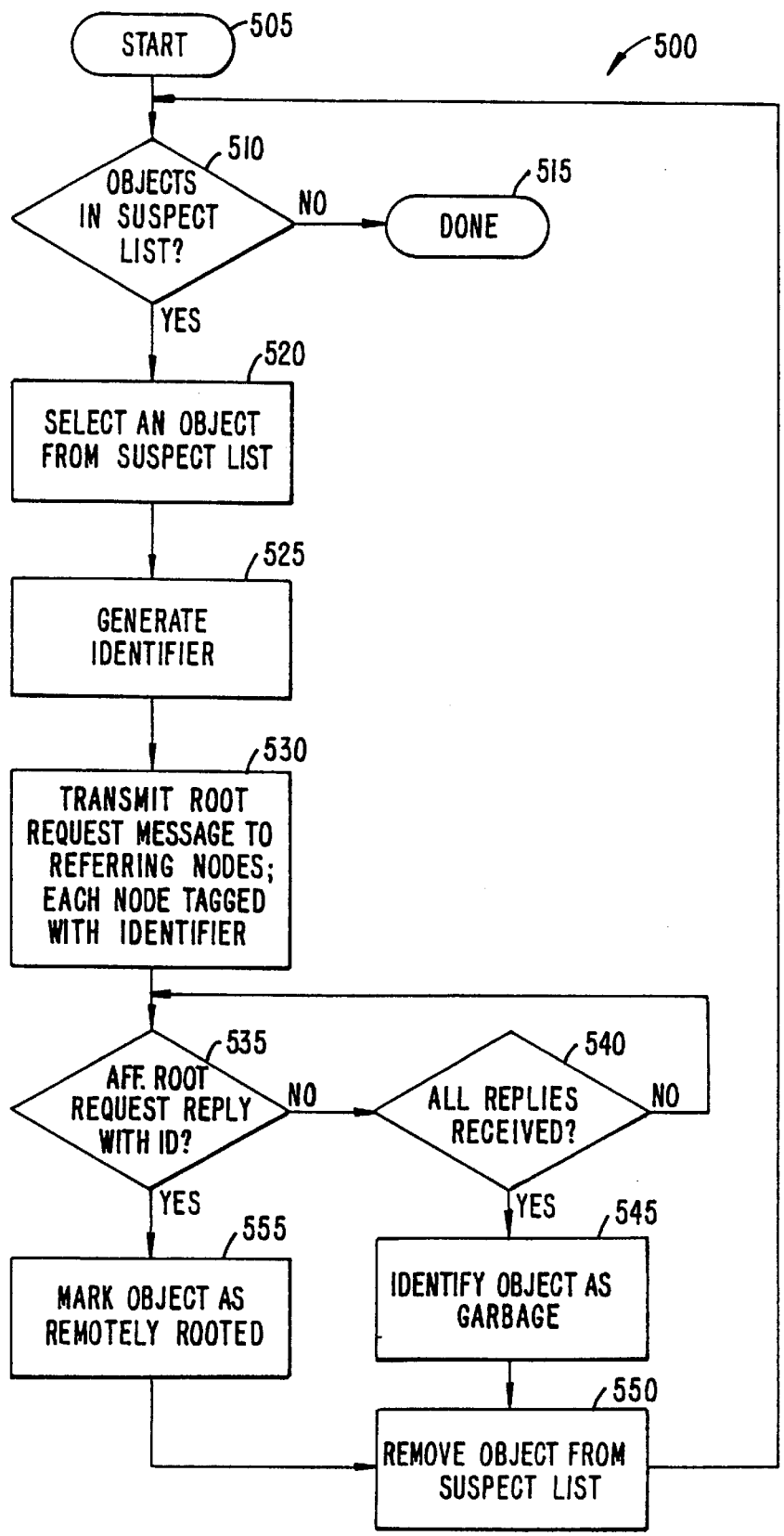
FIG. 5 is a flowchart of a preferred method for a garbage collecting system to determine whether to collect a selected node.

FIG. 5 is a flowchart of a preferred method for a garbage collecting process 500 to determine whether to collect a selected object under analysis. Garbage collecting process 500 begins (step 505) upon detection of an object in a suspect list, upon expiration of a preset period, or upon some asynchronous event (such as when available memory becomes critical) that triggers an analysis of an object. As the present invention presumes that each machine has some local garbage collection process available for identifying and collecting isolated obsoleted objects, garbage collecting process 500 may be relatively 'lazy' with regard to a frequency of operation since the primary focus of the preferred embodiment is on identifying and/or collecting cycles, or garbage referencing involving cycles.

In any event, a triggering event causes garbage collecting process 500 to advance from START, step 505, to step 510 to test for the presence of objects in a suspect list. Distributed network 400 maintains a suspect list and adds an object to the suspect list whenever the object becomes suspect (a candidate for collection). In the preferred embodiment, two events will cause an object to become suspect.

In the first case, a locally rooted object that stops being locally rooted will be suspect if that formerly locally rooted object had remote references to it and also has remote references to other objects. If the formerly locally rooted object has no references to other objects, such object cannot be in a cycle and will be collected by the local garbage collector process whenever the object(s) referring to it go away.

In the second case, a remotely rooted object becomes suspect whenever the remotely rooted object loses a remote reference to it. At step 510, garbage collecting process 500 tests whether there is any object in the suspect list. When the test at step 510 is negative, (no suspect objects) garbage collecting process 500 advances to step 515, DONE, to terminate garbage collecting process 500.

However, when one or more objects are in the suspect list, the test at step 510 is affirmative and garbage collecting process 500 advances to step 520. Step 520 selects a test object from the suspect list to determine whether it should be identified as garbage and subject to collection. After selecting the test object from the suspect list at step 520, garbage collecting process 500 generates, at step 525, an identifier. In the preferred embodiment, the identifier is unique and is a sufficiently large random number to reduce the chance that two identifiers having the same value will be selected for different test objects undergoing concurrent analysis. The identifier serves to alert objects participating in the process as to whether any specific root request message is being resolved.

After generating the identifier at step 525, garbage collecting process 500 transmits a root request message from the test object to all those objects that directly refer to it (step 530). These objects are called reference objects and are the origination of each branch of the inverse reference graph for the test object. The root request message is tagged with the identifier generated in step 525 and follows the inverse reference graph established for the test object. The root request message is transmitted to all the objects on the test object's inverse reference graph.

As will be explained in greater detail below in relation to FIG. 6, the response that each receiving object makes to the root request message indicates whether the receiving object is locally rooted, or coupled to a locally rooted object as identified by the receiving object's inverse reference graph or whether a particular branch should be disregarded when determining the garbage status of the test object. The response is either affirmative or disregard. In the preferred embodiment, relevance is determined based upon whether a branch includes a rooted object.

After transmitting the root request message at step 530, garbage collecting process 500 tests at step 535 whether an incoming message is an affirmative reply. Each incoming message from a reference object that is tagged with the unique identifier is a reply message. If the reply message is disregard, then garbage collecting process 500 advances to step 540 from step 535. Step 540 tests whether a reply has been received from each reference object. If all of reference objects have not replied to the root request message, garbage collecting process 500 returns to step 535 to test the next reply message.

However, if at step 540, the test determines that all of the reply messages have been received, then garbage collecting process 500 advances to step 545 instead of step 535. Step 545 identifies the test object as garbage (and in optional embodiments step 545 may collect the test object) and advances to step 550 to remove the test object from the suspect list. After step 550, garbage collecting process 500 returns to step 510 to test whether there are any objects remaining in the suspect list.

With regard to the test of step 535, if at any time an affirmative reply message is received, garbage collecting process 500 advances to step 555 rather than to step 540. Step 555 marks the test object as remotely rooted. Thereafter, garbage collecting process 500 advances to step 550 to remove the test object from the suspect list. When the suspect list is empty, garbage collecting process 500 terminates at step 515.

Figure 6:
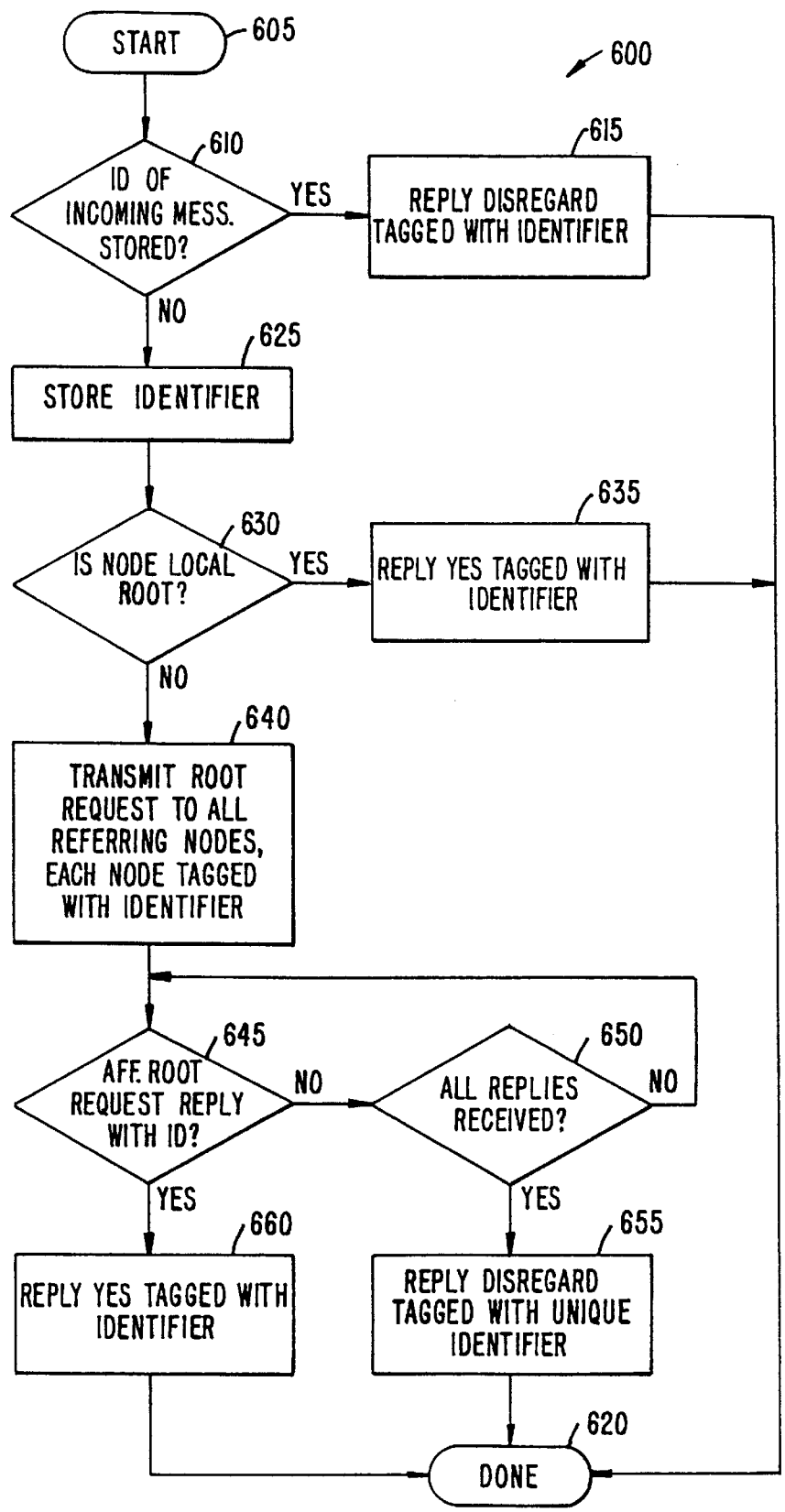
FIG. 6 is a flowchart of a preferred method for operating suspect nodes in accordance with the present invention.

FIG. 6 is a flowchart of a preferred method for a receiving object operating process 600 to determine a response of any object to an incoming root request message from a requesting object. Receiving object operating process 600 is applicable to every object referenced by a test object's inverse reference graph, including all the reference objects as well as the test object itself.

Receiving object operating process 600 begins at step 605, START, whenever an object receives an incoming root request message. A receiving object first advances to step 610 to test whether the identifier associated with the incoming root request message has already been stored. Whenever a receiving object has stored the same identifier as the identifier of an incoming root request message, it means that it is processing the root request message and should therefore ignore the later request. Therefore, if the test at step 610 is affirmative, then receiving object operating process 600 advances to step 615 to transmit a disregard reply to the requesting object. After step 615, receiving object operating process 600 advances to step 620 to terminate receiving object operating process 600.

However, if the test at step 610 is negative, then receiving object operating process 600 stores the identifier associated with the root request message received from the requesting object at step 625. Thereafter, at step 630, receiving object operating process 600 tests whether the receiving object is locally rooted. If the receiving object is locally rooted, receiving object operating process 600 advances to step 635. At step 635, receiving object operating process 600 transmits an affirmative reply to the requesting object and thereafter advances to step 620 to terminate receiving object operating process 600.

Should the test at 630 indicate that the receiving object is not a locally rooted object, receiving object operating process 600 advances to step 640. At step 640, the receiving object transmits its own root request message, tagged with the identifier it received from the requesting object, to its reference objects. After transmitting the root request message at step 640, receiving object operating process 600 tests reply messages that the receiving object receives from its reference objects. The test at step 645 determines whether the reply message is affirmative. If the reply message is not affirmative, receiving object operating process 600 advances to step 650 to test whether all replies have been received. If not, receiving object operating process 600 returns to step 645.

However, if at test 650, receiving object operating process 600 determines that all replies have been received, receiving object operating process 600 advances to step 655 from step 650. At step 655, the receiving object transmits a disregard reply, tagged with the identifier, to the requesting object and thereafter advances to step 620 to terminate receiving object operating process 600.

With regard to the test at step 645, if the reply message from the reference object is affirmative, receiving object operating process 600 advances to step 660. At step 660, receiving object operating process 600 transmits an affirmative reply, tagged with the identifier, from the receiving object to the requesting object. Thereafter, receiving object operating process 600 advances to step 620 and terminates.

In alternate embodiments, once a test object is determined to be garbage by garbage collecting process 500, a test object may send a collection message to objects referenced in the inverse reference graph having the unique identifier, that they too are garbage. Or the test object may send the garbage collector the identifier and the garbage collector may use the unique identifier to collect those obsolete objects.

In conclusion, the present invention provides a simple, efficient solution to a problem of distributed garbage collection involving cycles. While the above is a complete description of the preferred embodiments of the invention, various alternatives, modifications, and equivalents may be used. Therefore, the above description should not be taken as limiting the scope of the invention which is defined by the appended claims.

What is claimed is:

1. In a distributed computer system having a plurality of concurrently active processes that have instantiated a plurality of objects in a memory associated with the distributed computer system, a method of operating the distributed computer system comprising the steps of:

selecting a suspect object from the plurality of objects for testing to determine whether said suspect object is garbage;

identifying an inverse reference graph for said suspect object wherein each object of a subset of objects of the plurality of objects referentially coupled to said suspect object are represented as nodes on said inverse reference graph and wherein each edge between a pair of nodes defines a referential relationship between a pair of objects of said subset of the plurality of objects;

testing each branch of said inverse graph coupled from a suspect node associated with said suspect object to a referring node associated with a referring object to determine whether any branch of said inverse reference graph is relevant to establish whether said suspect object is garbage; and identifying said suspect node as garbage when no branch is relevant to establish whether said suspect node is garbage.

2. The distributed computer operating method of claim 1 wherein said testing step comprises the steps of:

generating an identifier;

transmitting a root request message, tagged with said identifier, to each object of a plurality of referring objects of said suspect object as identified by branches of said inverse reference graph originating from said suspect object wherein each branch receives a separate root request message tagged with said identifier; and receiving a reply message, tagged with said identifier, from each branch, each said reply message from any particular branch indicating whether said particular branch is to be disregarded for determining whether said suspect object is garbage.

* * * * *